April 22, 1969   R. J. THOMPSON ET AL   3,440,030
PROCESS USING GAS INLETS TO LATERALLY STRETCH GLASS
DURING FLOAT GLASS MANUFACTURING
Filed Aug. 15, 1966   Sheet 3 of 3
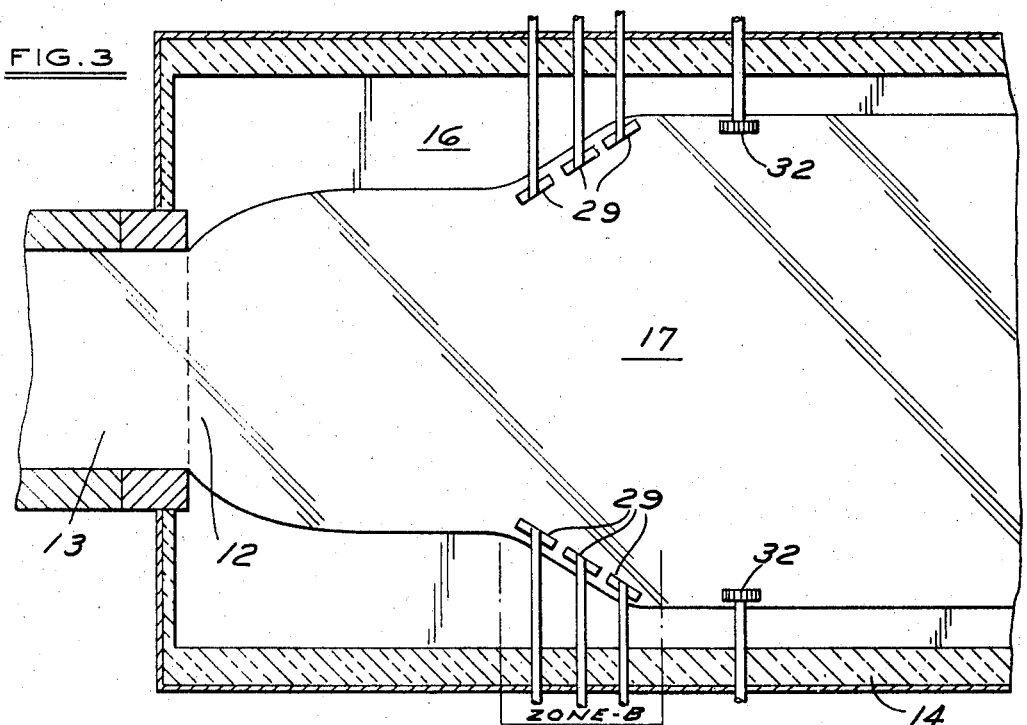
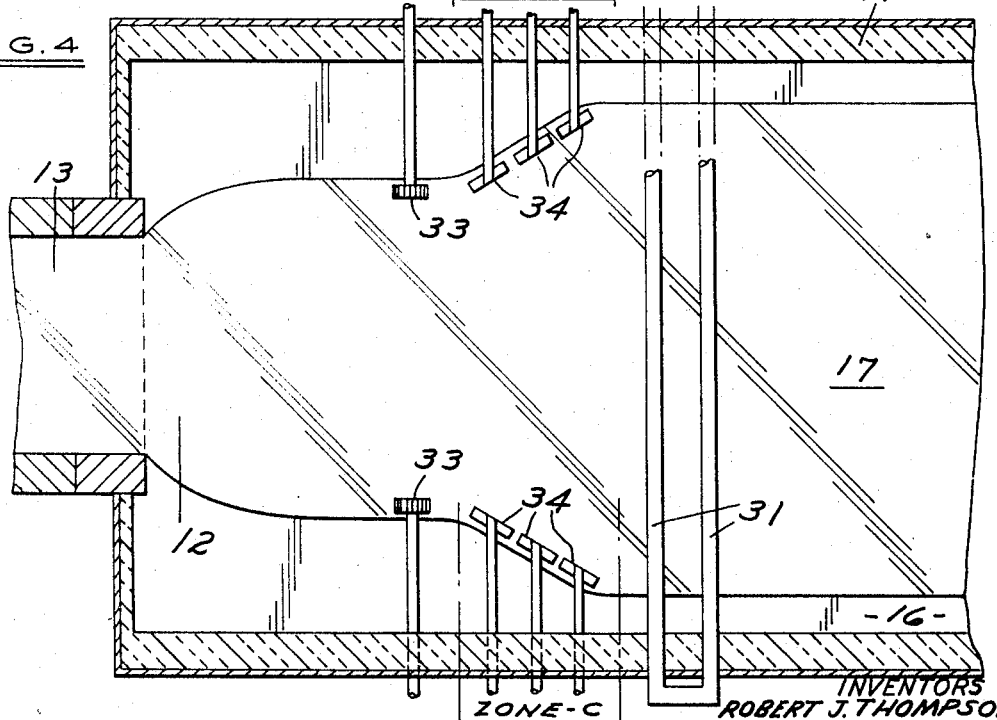
INVENTORS
ROBERT J. THOMPSON
DORIAN R. GRAY
PREMAKARAN T. BOAZ
JOHN H. MEYER - HERBERT W. CHOLGER
BY  P. F. Hilder
ATTORNEY United States Patent Office 3,440,030
Patented Apr. 22, 1969

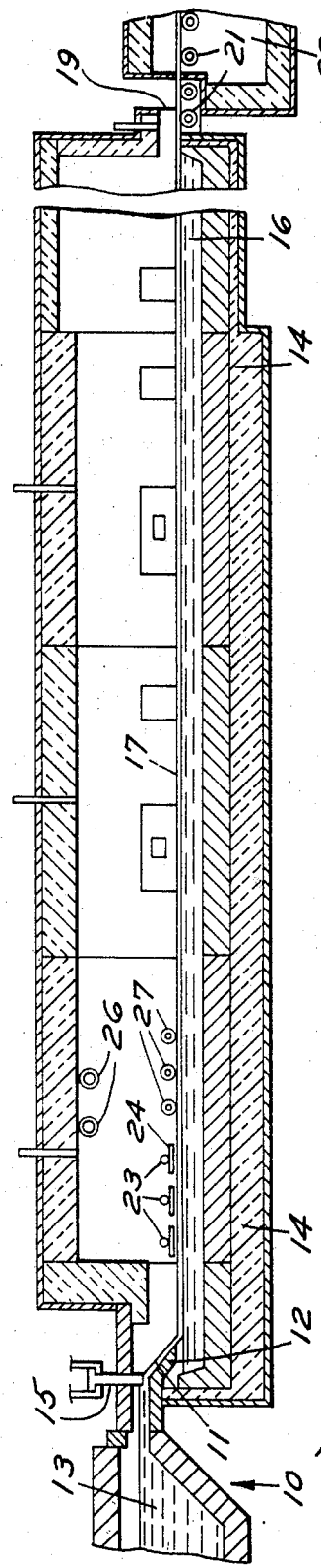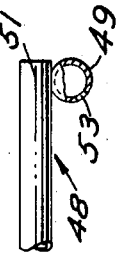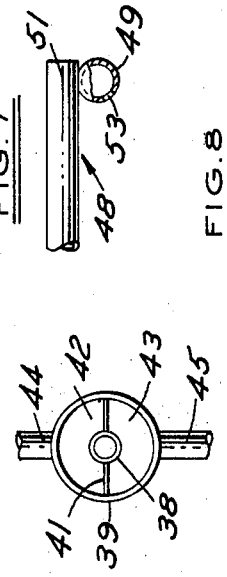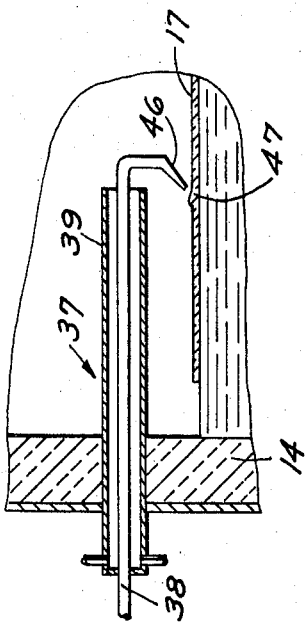
INVENTORS
ROBERT J. THOMPSON - DORIAN R. GRAY
PREMAKARAN T. BOAZ - JOHN H. MEYER
HERBERT W. CHOLGER
BY
P. F. Hilder
ATTORNEY

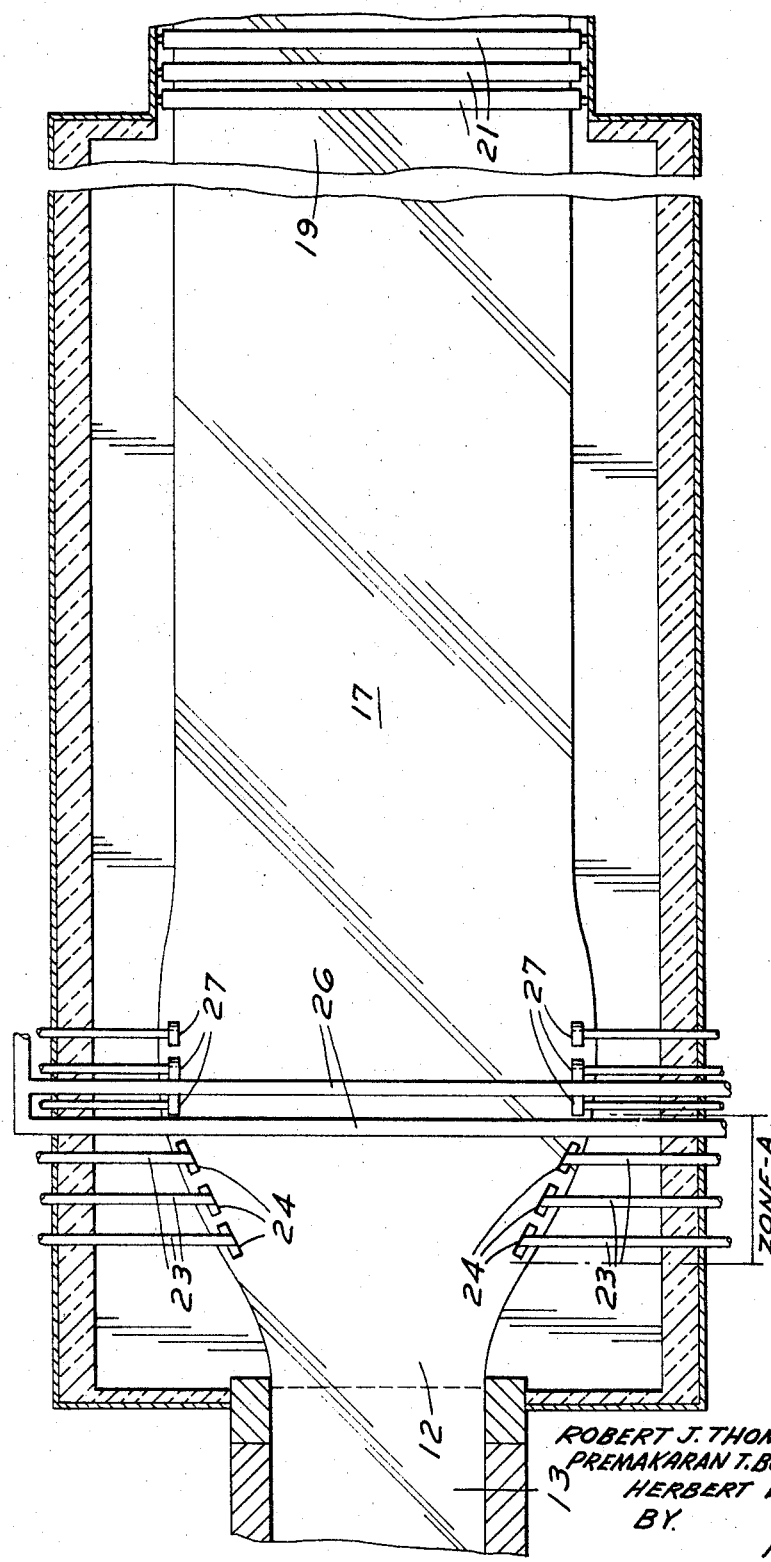

3,440,030
PROCESS USING GAS INLETS TO LATERALLY STRETCH GLASS DURING FLOAT GLASS MANUFACTURING
Robert J. Thompson, Monroe, Premakaran T. Boaz, Detroit, Herbert W. Cholger, Taylor, Dorian R. Gray, Wayne, and John H. Meyer, Garden City, Mich., assignors to Ford Motor Company, Dearborn, Mich., a corporation of Delaware
Filed Aug. 15, 1966, Ser. No. 572,497
Int. Cl. C03b 18/02
U.S. Cl. 65—99         5 Claims

ABSTRACT OF THE DISCLOSURE

A method for producing glass of less than equilibrium thickness has the following steps. Molten glass is delivered to a molten bath housed in a glass processing chamber. The glass is flowed out on the bath and, before a ribbon of glass having an equilibrium thickness is established on the bath, lateral stretching forces are applied to the ribbon edges by impinging jets of fluid thereagainst. The temperature of the glass is high enough that solid rolls cannot be brought into contact therewith. The stretched ribbon is cooled to a temperature whereat the glass will form a self-supporting ribbon of glass having a thickness less than equilibrium thickness. In an alternate method, the glass is permitted to flow out upon the bath to form a ribbon of glass with an equilibrium thickness. In this case the glass will be cooled to a temperature whereat it can be engaged by solid rolls. The lateral stretching of the glass is accomplished by utilization of jets of fluid directed against the lateral edges of the ribbon of glass.

---

This invention relates to the manufacture of glass by the float process.

In the manufacture of glass by the float process, a continuous ribbon of initially molten glass is formed on the surface of a molten bath contained in a chamber, the glass being fluid enough to flow so as to even out surface irregularities. The glass tends to flow under the influence of gravity and surface tension to an equilibrium thickness of about 0.280 inch. The ribbon, which floats on the surface of the bath, is cooled as it moves along the bath until at the end of the chamber, it has hardened enough to be conveyed by rollers through an annealing lehr without marking the surface of the glass.

Glass of less than equilibrium thickness may be formed by longitudinally attenuating the ribbon while it is still soft. If, however, the edges of the ribbon are laterally unrestrained during attenuation, the ribbon will be narrowed in about the same percentage as the reduction in thickness. For example, if 1/8″ (about 0.125″) glass is to be made, the ribbon must be stretched about four times its original length. If the ribbon is being formed on the metal bath at about 160 inches per minute, the ribbon discharge speed from the process will be at least about 550 inches per minute. This large degree of longitudinal stretch tends to magnify any minor imperfections of the glass. Moreover, the narrower ribbon results in a lower yield of usable glass because the edge trim is a higher portion of total width and because a narrow ribbon cannot be cut as efficiently into commercially usable rectangles as can a wider ribbon.

In addition, the extreme degree of longitudinal stretch required to obtain 1/8″ glass by the above method frequently results in visual distortion in the glass produced by minor nonuniformity of temperature or composition, so as to produce glass of not completely uniform thickness and minor nonparallelism of the opposite faces.

In assignee's U.S. patent application, Ser. No. 482,510 now abandoned, it has been disclosed that the ribbon can be laterally stretched or held by power driven edge rolls spaced along opposite sides of ribbon and rotating in a plane outwardly divergent from the center line of the ribbon on the discharge side of the rolls. These rolls bear against the upper surface of the ribbon to apply an outward tractive force to the glass. Usually lateral stretching by the rolls is accompanied by a simultaneous or subsequent longitudinal stretch to obtain the desired thickness of the ribbon.

Known methods of manufacturing the ribbon by mechanically applying lateral or longitudinal tractive force tend to produce some visual distortion in glass attenuated by these methods, and it has been found difficult to maintain a uniform thickness of the glass, especially if some variation in temperature across the ribbon exists or if the composition of the glass is not completely uniform. Further, the application of edge rolls to each edge of the ribbon results in marking a substantial portion of the glass (up to 20% of total surface area) which increases the loss due to edge trim or offal. Also, mechanically driven rolls can only be applied to the glass to obtain an effective tractive effort after the edges of the ribbon have been slightly cooled and, thus, at these lower temperatures, difficulty may be encountered in attenuating the ribbon by lateral stretching without causing undue irregularities in the glass. At the lower temperatures, the glass is more viscous and, therefore, more prone to distortion as external forces are applied to the ribbon.

According to the present invention, the glass ribbon formed on the molten metal bath in the chamber at either equilibrium or thicker than equilibrium thickness is laterally stretched or held by the application of jets of pressurized fluid to the lateral edge portions of the ribbon to cause them to flow laterally outwardly, thereby attenuating and holding the ribbon against return to equilibrium thickness while it is still subject to flow. Preferably, the fluid is an inert or nonoxidizing gas under pressure which will not chemically react with the molten metal of the bath. The pressurized stream of gas is directed by nozzles positioned above the edge portions of the glass ribbon and so directed that the jet streams extend laterally downwardly and outwardly to cause the lateral edges of the ribbon to be forced laterally outwardly on the molten bath, thus laterally stretching the ribbon to the desired thickness.

To minimize distortion and facilitate the lateral attenuation, the jet streams are applied to the glass in the hotter zones of the chamber, preferably either at the entrance or after the ribbon has flowed to equilibrium thickness. After the ribbon is laterally stretched by the jets, the ribbon may be maintained in its attenuated condition by mechanically driven edge rolls engaging the edge portions of the ribbon or by the application of coolers to make the ribbon more viscous, or by additional jets. Lateral stretching or holding may be accompanied by simultaneous or subsequent longitudinal stretching. The exit speed of the ribbon is not increased by the lateral stretch, thus reducing distortion heretofore caused when excessive longitudinal stretching was the only means available for attenuating the ribbon and also facilitating cutting of the ribbon upon its exit from the annealing lehr.

Among the objects of the present invention are to provide a method and apparatus for stretching to a thickness below equilibrium thickness a glass ribbon bing formed by floating the glass on a bath of molten metal; to provide such a method and apparatus in which jets of fluid are applied to the marginal edges of the ribbon to cause the glass to flow laterally outwardly so as to stretch the ribbon; to provide a means for maintaining the glass ribbon in an attenuated condition after being laterally stretched; and generally to improve methods of producing thinner glass by the float process.

Other objects and advantages will become more apparent when the description is read in conjunction with the drawings in which:

FIGURE 1 is a diagrammatic vertical longitudinal section of a float glass chamber according to the present invention containing a molten bath utilized in the manufacture of float glass, including a portion of the adjacent delivery end of the glass melting and refining furnace and a portion of the annealing lehr at the other end.

FIGURE 2 is a diagrammatic horizontal section taken generally along line 2—2 of FIGURE 1.

FIGURE 3 is a fragmentary horizontal section similar to FIGURE 2 depicting a second embodiment of the invention, in which jet attenuating devices of this invention are positioned downstream of the entrance end of the chamber.

FIGURE 4 is a fragmentary horizontal section similar to FIGURE 2 depicting a third embodiment in which jet attenuators and edge rolls are applied at alternate locations.

FIGURE 5 is a diagrammatic fragmentary vertical section through one side of the chamber, showing one type of jet attenuator positioned with respect to the glass.

FIGURE 6 is a sectional view taken along line 6—6 of FIGURE 5.

FIGURE 7 is a side elevation of a nozzle portion of one jet attenuating device.

FIGURE 8 is a front elevation of the jet attenuating device of FIGURE 7.

Referring now to the drawings, the refining end of a glass melting and refining furnace 10 is shown at the left of FIGURE 1, the glass at this station being at a temperature of about 2300° F. The glass furnace 10 and its refining end may be more or less conventional in design and generally similar to glass furnace for manufacturing plate glass.

A channel or spout 11 and graphite ramp 12 may be provided at the entrance end of the chamber 14 for delivering molten glass 13 by gravity at a uniform rate from the furnace to the chamber. A gate 15 is provided in the spout 11 to control the rate of glass delivered.

A float chamber 14, which may be generally similar to the chamber described in Basler et al. U.S. application 409,664 filed Nov. 9, 1964, now abandoned, comprises an enclosed, refractory-lined structure containing a body 16 of molten metal, preferably tin.

The glass 13, when leaving the lower end of the ramp 12, is very fluid and tends to flow outwardly to form a ribbon 17 and, if permitted to flow laterally unhindered, will form a ribbon 17 on the bath which is of equilibrium thickness (approximately .280 inch) under the influence of gravity and surface tension, as described in U.S. Patent 3,083,551. The ribbon 17 of molten glass extends for the length of the chamber 14 and exits through an opening 19 at the exit end of the chamber 14 and onto a series of power driven conveyor rolls 21 of an annealing lehr 22.

In the first embodiment of this invention, lateral attenuation of the ribbon to permit thinning the ribbon to less than equilibrium thickness is accomplished by mounting jet attenuators 23, as hereinafter described, above each lateral edge of the glass as it leaves the ramp 12. The outward flow of the glass on the molten bath 16 is increased by jets or streams of fluid that are laterally outwardly directed against the marginal edge portion of the glass ribbon 17 by nozzles 24. The fluid preferably is a gas that is nonoxidizing and does not chemically react to any substantial extent with the molten tin or the glass. Nitrogen, argon or any gas which is substantially non-oxidizing at the temperatures found within the chamber 14 is satisfactory as the major portion of the gas. A minor proportion of the gas can be a reducing agent such as hydrogen or carbon monoxide to react with any oxygen that may be present in the chamber. Preferably, the gas used is substantially the same as the atmosphere within the chamber and may either be connected directly to a more or less conventional exothermic generator (not shown) or the atmosphere can be withdrawn from the chamber 14 and circulated to the jet attenuator 23.

As shown in FIGURE 2, the jet attenuators 23 are positioned along a line which is outwardly divergent in the direction of ribbon movement with respect to the center line of the chamber 14 and over both edges of the glass ribbon 17 being formed on the metal bath 16 as the glass 13 leaves the ramp 12 (identified as zone A in FIGURE 2). Outwardly directed jets of gas from each nozzle 24 impinge on the marginal edges of the ribbon 17 at an acute angle to the plane of the ribbon to cause the edges of the ribbon to flow outwardly to laterally stretch the ribbon. The jet attenuators are positioned in a manner to cause the jets to apply a continuous outward force onto the glass ribbon being formed to propel the lateral edges of the glass in an outward direction so as to form a wide ribbon of uniform thickness which is substantially less than equilibrium thickness.

After stretching is effected by the jets of gas, coolers 26 disposed above the stretched ribbon 17 may be used to cool the ribbon and maintain the ribbon in its stretched condition against its inherent tendency to flow to equilibrium thickness. Mechanical edge rolls 27 applied to the marginal edge portions of the ribbon 17 may be employed to supplement the coolers 26 in preventing the ribbon 17 from narrowing. The edge rolls 27 preferably are operated at a peripheral speed at which the ribbon is not accelerated, but merely guide and hold the ribbon in its stretched condition.

Further cooling takes place in the chamber 14 downstream from the edge rolls 27 to decrease the temperature of the ribbon 17 so that it may be removed at the end of the chamber 14 and pass over the rolls 21 in the annealing lehr 22 without injury to the surface of the glass. By increasing their speed slightly, the rolls 21 and edge rolls 27 may also be utilized to tension the ribbon within the chamber 14 for longitudinally stretching the ribbon somewhat simultaneously with or subsequent to lateral stretching, if desired.

A second embodiment of this invention is shown in FIGURE 3. In this embodiment, the ribbon 17 first is permitted to flow laterally unhindered to true parallelism of its faces and heal surface irregularities, substantially reaching equilibrium thickness. Jet attenuators 29 are positioned in zone B above each lateral edge of the ribbon 17, and before entering this zone, the ribbon 17 has flowed to substantially equilibrium thickness. Pressurized streams of gas emitted from the attenuators 29 are directed outwardly towards the marginal edges of the glass ribbon 17 at an acute angle to the plane of the ribbon to cause the reheated ribbon to flow outwardly under the influence of the gas streams, so as to be laterally stretched beyond the width determined by equilibrium thickness.

Coolers 31 and/or edge rolls 32 may be applied to the laterally stretched ribbon 17 downstream from the jet attenuators 29 to restrain the ribbon against return towards equilibrium thickness and reduced width and to stabilize the ribbon against lateral movement. If desired, the ribbon may be longitudinally stretched between the edge rolls 32 and the conveyor rolls 21.

In FIGURE 4 is shown a further embodiment of this invention in which the glass ribbon 13 leaving the ramp 12 is permitted to flow unhindered to equilibrium thickness on the molten bath 16. At least a first set of edge rolls 33 is applied to each edge of the ribbon of glass 17 to hold the ribbon stable prior to the stretching operation and assure maintaining proper position of the edge portion of the ribbon with respect to the jet attenuation devices 34 disposed above the ribbon 17 downstream from the first set of edge rolls 33. The jet attenuation devices 34 apply jets of fluid to the lateral edge portions of the ribbon 17, in the manner previously described, to laterally stretch the ribbon in a zone (identified as zone C in FIGURE 4). Coolers 31 and/or one or more additional sets of edge rolls may be applied downstream from zone C to maintain the ribbon 17 in a laterally stretched condition.

The set of edge rolls 33 engaging the opposite edge portions of the ribbon 17 in advance of the jets 34 stabilize the ribbon and minimize snaking of the ribbon in order to improve the lateral attenuation and prevent down time due to loss of continuity of the ribbon 17 on the molten bath 15.

In FIGURES 5-8 are shown illustrative jet attenuation devices which can be utilized in the embodiments of this invention to laterally stretch glass made by the float process.

The jet attenuation device 37 shown in FIGURE 5 comprises a feed pipe 38 that is connected to a fluid source (not shown) and extends through the sidewall of the chamber 14 to a position above the edge portion of the glass ribbon 17 being formed on the molten bath 16 contained in the chamber 14. Due to the high temperatures existing in the area of the chamber 14 where lateral stretching is effected, the feed pipe is cooled by an outer jacket 39 that is split by a horizontally extending baffle 41 into a feed portion 42 and return portion 43 as best seen in FIGURE 6. Coolant such as water is circulated through the jacket 39 by an inlet 44 and outlet 45 attached to the jacket 39 outside the chamber 14 to keep the jet attenuation device 37 from softening.

At the terminal inner end of the feed pipe 38 is a nozzle portion 46 through which the gas is emitted as a fine flattened jet. The nozzle portion 46 shown in FIGURE 5 is fabricated by flattening the end of the feed pipe 38 to define a slit and bending it so that the gas stream is directed outwardly towards the marginal portion of the ribbon 17. The angle of impact of the jet to the plane of the ribbon may vary between wide limits, but must be an acute angle having sufficient outward component to force the margin of the ribbon laterally outward against surface tension. As the ribbon is very fluid at this state of forming, a slightly slanted V-shaped groove 47 is formed in the top surface of each margin of the ribbon 17 by the jet of gas. The force of the jet causes the edges of the ribbon to flow laterally outwardly on the molten tin to laterally stretch the ribbon 17, thereby widening and thinning it. A second jet attenuating device 37 will be located at the opposite edge portion of the ribbon 17. Additional jet attenuation devices 37 may be located outwardly and downstream from the first pair of devices 37 to direct further blasts of gas towards the margins of the ribbon to continue or hold the lateral stretch of the ribbon 17 against its inherent tendency to return to equilibrium thickness and reduced width.

An alternative design of nozzle portion is indicated in FIGURES 7 and 8. In this instance, each individual nozzle portion 48 may consist of a longitudinally extending short length of pipe or manifold 49 for receiving and distributing the gas entering through the feed pipe 51, which serves to support the pipe 49. Pipe 49 has a plurality of apertures 53 along one element of the pipe defining a series of closely spaced jets lying in substantially a single plane inclined at an acute angle to the plane of the ribbon. Obviously, many other forms of jets can be used in the practice of the present invention.

The pressure required for laterally stretching the glass varies with the type and size of nozzle and the spacing from the ribbon. Excessive pressure will tend to tear the ribbon, while the amount of pressure used must be sufficient to transmit the required amount of lateral force to the margin of the ribbon without tearing the ribbon. It has been found that pressures from a very few p.s.i. up to 40 p.s.i. have been used successfully with different jets, but these pressures should not be considered as limiting since the pressure required depends to a large degree on the size of the jet or jets and the spacing from the ribbon.

What is claimed is:

1. A method for producing glass, the glass having a final thickness which is less than the equilibrium thickness obtained when molten glass is placed on a molten metal bath and allowed to cool thereupon in an unrestrained condition under the influence of gravity and surface tension to a temperature at which the glass is self-supporting, the method comprising the steps of:

continuously delivering a prescribed quantity of molten glass to a molten metal bath housed in a glass processing chamber;

flowing the molten glass out upon the molten metal bath to initially establish a ribbon having a thickness between the lateral edges thereof greater than the equilibrium thickness;

laterally stretching the ribbon of glass of greater than equilibrium thickness to decrease the thickness of the ribbon to less than equilibrium thickness, the stretching being accomplished by impinging jets of fluid against the lateral edges of the ribbon to force the glass in the vicinity of the lateral edges outwardly upon the bath, the temperature of the glass being sufficiently high during the stretching operation both that the glass would return to an equilibrium condition if it were unrestrained and that the contact thereof by solid edge rolls would not effect a stretching thereof;

cooling the ribbon of glass while the ribbon is in a stretched condition to a temperature whereat the glass will not return to an equilibrium condition if unrestrained thereby to form a self-supporting glass ribbon having a thickness less than equilibrium thickness; and removing the self-supporting glass ribbon from the glass processing chamber.

2. The method of manufacturing glass as defined in claim 1 wherein the fluid jets utilize a fluid having the same composition substantially as the atmosphere utilized in the glass processing chamber.

3. A method for producing glass, the glass having a final thickness which is less than the equilibrium thickness obtained when molten glass is placed on a molten metal bath and allowed to cool thereupon in an unrestrained condition under the influence of gravity and surface tension to a temperature at which the glass is self-supporting, the method comprising the steps of:

continuously delivering a prescribed quantity of molten glass to a molten metal bath housed in a glass processing chamber;

flowing the molten glass out upon the molten metal bath until the glass forms a ribbon of glass of equilibrium thickness;

laterally stretching the ribbon of glass after it achieves an equilibrium thickness to decrease the thickness of the ribbon to less than equilibrium thickness, the stretching being accomplished by impinging jets of fluid against the lateral edges of the ribbon to force the glass in the vicinity of the lateral edges outwardly upon the bath, the temperature of the glass during the stretching operation both being high enough that the glass would return to an equilibrium condition if it were unrestrained and being low enough that solid edge rolls could be utilized in the stretching of the glass;

cooling the ribbon of glass while the ribbon is in a stretched condition to a temperature whereat the glass will not return to an equilibrium condition if unrestrained thereby to form a self-supporting glass ribbon having a thickness less than equilibrium thickness; and removing the self-supporting glass ribbon from the glass processing chamber.

4. The method of manufacturing glass as defined in claim 3 wherein longitudinal stretching forces are applied to the glass ribbon along its length in the same area as the lateral stretching forces are applied to the ribbon.

5. The method of manufacturing glass as defined in claim 4 wherein the fluid jets utilize a fluid having the same composition substantially as the atmosphere utilized in the glass processing chamber.

References Cited

UNITED STATES PATENTS

| 3,353,943 | 11/1967 | Loutte | 65—182 |
| 3,264,081 | 8/1966 | Pilkington | 65—99 |

DONALL H. SYLVESTER, *Primary Examiner.*

R. V. FISHER, *Assistant Examiner.*

U.S. Cl. X.R.

65—182, 91, 200, 65